US012783475B2

(12) United States Patent
Gershuni et al.

(10) Patent No.: US 12,783,475 B2
(45) Date of Patent: Nov. 3, 2026

(54) MECHANISMS FOR APPLYING SCHEMA CHANGES TO DATABASE TABLES

(71) Applicant: Salesforce, Inc., San Francisco, CA (US)

(72) Inventors: David Gershuni, Carmel, IN (US); Simon Y. Wong, San Carlos, CA (US); Mikhail Lychagin, San Francisco, CA (US); Jun Yuan, Great Neck, NY (US); Kaushal Mittal, Mountain House, CA (US); Jacob Jonghan Park, Toronto (CA); Vaibhav Arora, San Francisco, CA (US); Dhanashree Kashid, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/191,707

(22) Filed: Apr. 28, 2025

(65) Prior Publication Data

US 2026/0339901 A1 Oct. 29, 2026

(51) Int. Cl.
*G06F 16/00* (2019.01)
*G06F 16/21* (2019.01)
*G06F 16/27* (2019.01)

(52) U.S. Cl.
CPC .......... *G06F 16/211* (2019.01); *G06F 16/275* (2019.01)

(58) Field of Classification Search
CPC .. G06F 16/254; G06F 16/2282; G06F 16/273; G06F 16/22; G06F 16/27; G06F 3/06; G06F 16/90335; G06F 16/2393; G06F 16/24539; G06F 16/2379; G06F 16/213; G06F 16/258; G06F 16/221; G06F 16/214; G06F 16/1734; G06F 16/211; G06F 16/182; G06F 9/44505; G06F 16/2358
See application file for complete search history.

(56) References Cited

U.S. PATENT DOCUMENTS 10,387,388 B2 8/2019 Doan et al.
11,526,465 B2 12/2022 Shetty et al.
11,748,318 B1 * 9/2023 Cseri .................... G06F 16/211 711/154
11,940,963 B2 3/2024 Sgroi et al.
(Continued)

*Primary Examiner* — Yicun Wu
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to implementing database table schema changes. A computer system stores a source table associated with a current schema that is used to process transactions against a database. The computer system creates a target table associated with a temporary schema, where the target table includes one or more database table schema changes relative to the source table. The computer system provisions synchronization triggers to capture record changes made to the source table and replicate them on the target table. The computer system then performs a copy operation to copy data stored in the source table to the target table while transactions operate on the source table. After completing the copy operation, the computer system performs a schema swap operation to associate the current schema with the target table and not the source table so that the target table is used to process transactions against the database.

20 Claims, 9 Drawing Sheets

(56) References Cited

U.S. PATENT DOCUMENTS

| | | | | |
|---|---|---|---|---|
| 12,066,998 | B2 | 8/2024 | Kwong et al. | |
| 2018/0217819 | A1 | 8/2018 | Leen et al. | |
| 2018/0322153 | A1 | 11/2018 | Weissman et al. | |
| 2018/0373767 | A1* | 12/2018 | Specht | G06F 16/214 |
| 2021/0334251 | A1* | 10/2021 | Mire | G06F 16/221 |
| 2022/0229821 | A1* | 7/2022 | Greenshpan | G06F 16/213 |
| 2022/0309045 | A1* | 9/2022 | Lambert | G06F 16/213 |
| 2024/0020281 | A1 | 1/2024 | Iskender et al. | |

* cited by examiner

Tenant Progress Table 407

| Org_ID 208 | Blocked 412 | Chunked 414 | Copied 416 | Validated 418 |
|---|---|---|---|---|
| tenant1 | t | t | f | f |
| tenant2 | t | f | f | f |

Block Progress Table 420

| Org_ID 208 | Key_Prefix 422 | Chunked 424 |
|---|---|---|
| tenant1 | aaa | t |
| tenant1 | bbb | t |
| tenant2 | ccc | f |

Chunk Progress Table 426

| Org_ID 208 | Min_Entity_ID 430 | Max_Entity_ID 432 | Copied 434 | Validated 436 |
|---|---|---|---|---|
| tenant1 | aaa009 | aaa097 | t | f |
| tenant1 | aaa097 | aaazzz | t | f |
| tenant1 | bbb004 | bbb123 | t | f |
| tenant1 | bbb123 | bbbzzz | f | f |

MECHANISMS FOR APPLYING SCHEMA CHANGES TO DATABASE TABLES

BACKGROUND

Technical Field

This disclosure relates generally to database systems and, more specifically, to various mechanisms for applying schema changes to database tables.

Description of the Related Art

Enterprises routinely implement database management systems (or, simply "database systems") that enable users to store data in an organized manner that can be efficiently accessed and manipulated. The stored data is organized, often in the form of database tables, according to a database catalog that includes one or more schemas that define the structure of the database by defining tables, columns, data types, relationships, constraints, etc. The database catalog is used throughout the database's life, facilitating interactions with the stored data as the database system accesses data from database objects (e.g., tables) in the database in accordance with the schema(s). Over time, schemas typically need to be modified to accommodate changes. For example, schema changes may be made to a table, such as adding or dropping columns, altering the primary key definition, changing column data types to improve performance, etc. Making schema changes often involves extensive downtime in which database objects are inaccessible to normal database transactions.

DETAILED DESCRIPTION

Figure 1:
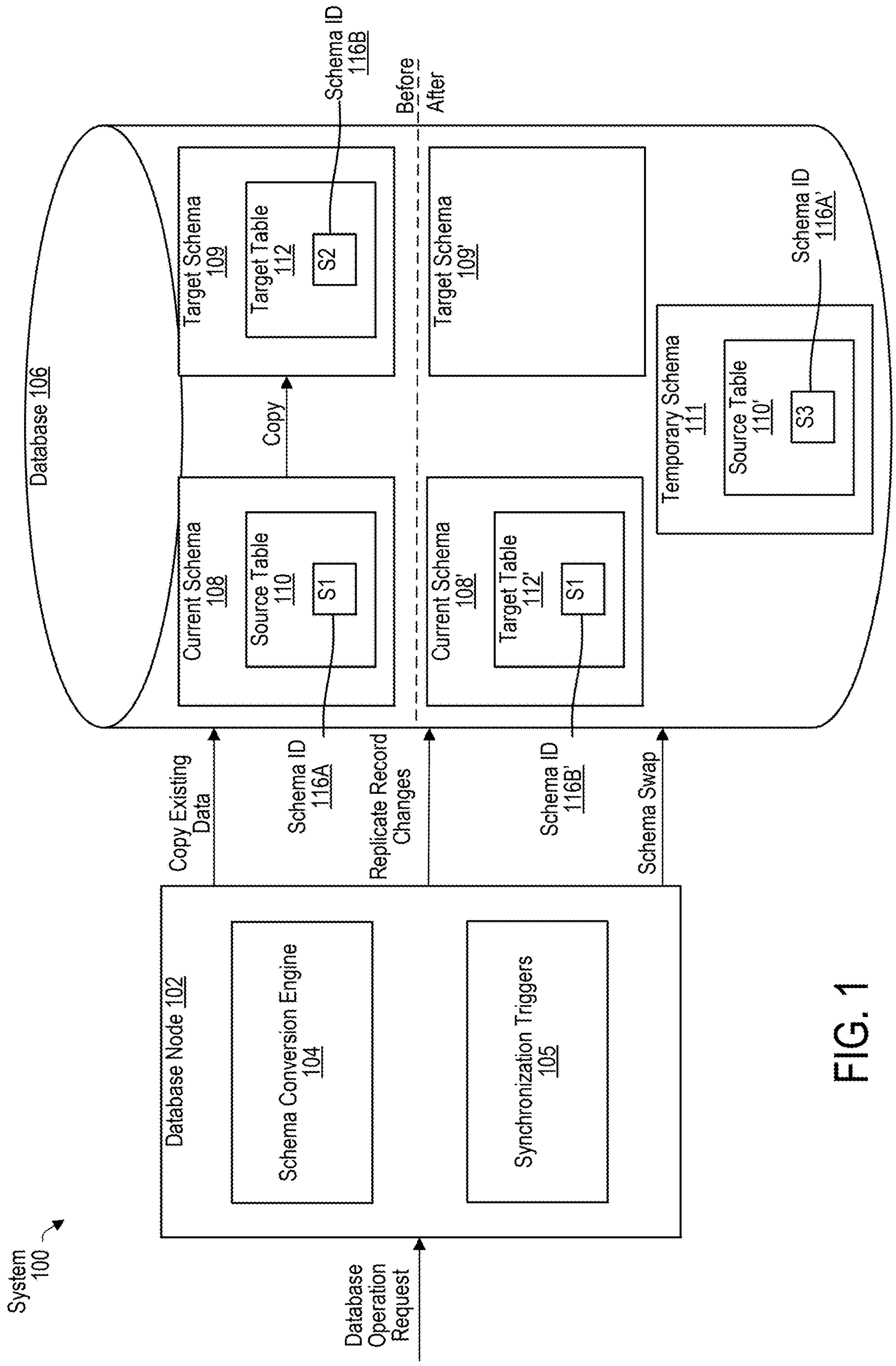
FIG. 1 is a block diagram that illustrates one embodiment of a system having a database and a database node that implements database table schema changes.

When servicing traffic, a database system references a database catalog to interpret how the data is organized, how different elements relate to one another, etc. This database catalog includes one or more schemas that organize database objects (e.g., tables, views, indexes, and functions) into separate groups/logical namespaces. Changes to these schemas are often made to support new features or functionality, improve database performance, address evolving data needs or regulatory compliance, etc. Some schema changes, such as adding a column to a table, can be made relatively easily without introducing downtime. But making other schema changes to an active schema that is actively being used by a database system can pose several technical challenges. These schema changes often require taking a table offline, blocking transactions, or implementing complex data replication mechanisms, all of which may introduce downtime, potential data loss, and/or operational inefficiencies.

Schema changes are often made to database tables. For example, schema changes can be made to add or drop columns, alter a database table's primary key definition, change column data types, convert a non-multi-tenant database table into a multi-tenant database table, reorder columns, etc. Some of the schema changes can be made to a database table without introducing downtime as such schema changes may not involve changing or rewriting existing data stored in the database table—e.g., adding a column having a default value does not involve changing the existing data. But certain schema changes made to the database table introduce downtime under conventional approaches as existing data is transitioned from the old table format to the new table format that reflects the changes. For example, changing a column's data type from "varchar" to "int" under conventional approaches can involve locking the associated database table and then rewriting the values of that column from text to integers. As another example, altering a database table's primary key definition (e.g., changing the key column order, adding a key column, etc.) can affect the indexes built on that database table. Conventional approaches can involve locking the database table and recreating one or more of the indexes. Accordingly, certain schema changes to a database table under conventional approaches introduce downtime as the database table becomes unavailable (e.g., exclusively locked by the process making the schema changes) to normal database traffic (e.g., database transactions resulting from database requests issued by application servers that interact with users). This downtime can impact the user experience and further cause the database system to fail to meet service level agreements that establish requirements (e.g., required response times). This disclosure addresses, among other things, the problem of how to implement database table schema changes without causing downtime.

Multi-tenant database architectures can also introduce challenges when implementing database table schema changes. In particular, certain architectures comprise multiple database instances (also referred to as "database cells") that each include a database that is managed by a database application. Multiple tenants (e.g., individuals, companies, etc.) can be assigned to the same database instance, which is responsible for processing their data. For various reasons, tenants can be migrated from one database instance to another database instance. For example, if the workload on a database instance becomes too high, one or more tenants of that database instance can be migrated to another database instance, including migrating their data from the former instance to the latter instance. In such multi-tenant database architectures, any approach to implementing database table schema changes may also have to handle tenant migrations that occur while a schema change is being made to a table that will be used by the incoming tenant. Accordingly, this disclosure also addresses how to implement database table schema changes in view of tenant migrations that may occur concurrently with implementing the changes.

This disclosure discusses techniques for implementing database table schema changes while ensuring data consistency and minimizing service interruptions. In various embodiments described below, a database system implements a table schema change process for making schema changes to a table that involves creating a target table having the schema changes and copying existing data from the source table to the target table while capturing record changes to the source table and replicating them on the target table. When creating the target table, the database system may create a temporary schema and then create the target table as a part of the temporary schema. The database system may also create indexes on the target table following definitions of the indexes on the source table.

To capture the record changes to the source table and replicate them on the target table, in various embodiments, the database system creates synchronization database triggers before copying the existing data from the source table to the target table. As an example, the database system may create an insert trigger that can detect the insertion of a new record into the source table and insert that new record into the target table. The database system may perform a copy operation to copy the existing data while ongoing database transactions do work on the source table, with the synchronization database triggers synchronizing that work to the target table. In various embodiments, before the target table is used, the database system validates the data of the target table by comparing it to the data of the source table.

When the source table and the target table are synchronized, the database system may perform a schema swap operation to associate the target table with a current schema being used by the database system to process database transactions and also disassociate the source table with that schema. In some embodiments, the schema swap operation results in the source table being associated with a temporary schema. As a result of the schema swap operation, the target table may then be used to service database transitional workloads instead of the source table.

In some embodiments, this database table conversion process supports tenant migration between different instances of the database system. In particular, a tenant can be migrated from one database instance to another database instance (e.g., to reduce the workload on the former instance). In various embodiments, the tenant is allowed to be migrated if both the source and destination database instances are undergoing the same process to update the same table. When that tenant is migrated, a snapshot of the tenant's data is generated. This snapshot may include process tracking metadata that is used by the source database instance to track the progress of the copy operation that is copying the tenant's data from the source table to the target table. In various embodiments, the destination database instance uses the progress tracking metadata to resume the copy operation for the tenant from the point at which it left off at the source database instance before the tenant's migration.

These techniques may be advantageous over prior approaches as these techniques allow for schema changes to be made to database tables with minimal to zero downtime. By creating a target table in a temporary target schema and copying over existing data from the source table while capturing changes to the source table, the source table does not have to be locked for the entire process and database transactions can continue to update the table. Said differently, by utilizing synchronization triggers, database transactions can continue to insert, update, and also delete records of the source table during the schema change process since the synchronization triggers will detect the changes and ensure that they are replicated over to the target table. By allowing for database transactions to continue to access and update the source table during the process, users can access and update the source table. Thus, users may experience minimal to zero downtime—that is, the schema change process may not impact the user experience. Also, by supporting tenant migration during this process, tenants can be migrated between database instances to address other pressing concerns (e.g., high workloads, low available storage, etc.) without having to wait for schema changes to be applied to a database table.

Turning now to FIG. 1, a block diagram of a system 100 is shown. System 100 includes a set of components that may be implemented via hardware or a combination of hardware and software routines. In the illustrated embodiment, system 100 includes a database node 102 and a database 106. As further shown, database node 102 includes schema conversion engine 104 and synchronization triggers 105, and database 106 includes current schemas 108 and 108' (also referred to as active schemas 108 and 108'), target schemas 109 and 109', and a temporary schema 111. Current schema 108' and target schema 109' are current schema 108 and target schema 109 after a process for implementing database table schema changes has been performed. As shown, current schema 108 includes a source table 110 with a schema ID 116A, target schema 109 includes a target table 112 with a schema ID 116B, current schema 108' includes target table 112' with a schema ID 116B', and temporary schema 111 includes source table 110' with a schema ID 116A'. The illustrated embodiment may be implemented differently than shown.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Accordingly, database node 102 and database 106 may execute on and use the available cloud resources of the cloud infrastructure (e.g., computing resources, storage resources, etc.) to facilitate their operation. As an example, program code executable to implement the components of database node 102 can be stored on a non-transitory computer-readable medium of server-based hardware included in a datacenter of the cloud provider and executed in a virtual machine hosted on that server-based hardware. But various components of system 100 may be implemented without the assistance of a virtual machine or other technologies such as containerization. In some embodiments, system 100 is implemented using a local or private infrastructure as opposed to a public cloud.

Database 106, in various embodiments, includes data that is organized in a manner that allows for access, storage, and/or manipulation of that data. Database 106 may be a key-value store that stores data as key-value pairs, where each piece of data (the value) is associated with a unique identifier (the key) that can be used to look up that piece of data. A value may range from a string or a number to complex objects, such as JavaScript Object Notation (JSON). The key-value store may be optimized for quick lookups, insertions, and updates and also support data partitioning and replication allowing data to be partitioned and replicated across multiple storage nodes in a distributed architecture. In various embodiments, database 106 is used to store data that is in a row format—that is, the data is organized into rows, where each row may represent a record (e.g., of a table).

In various embodiments, database 106 is part of a storage layer that is implemented or distributed across multiple storage servers or nodes, which can be located in different physical locations (e.g., different data centers in different regions). The storage layer may abstract away the complexities of physical storage from other components of system 100, allowing higher-level components (e.g., database node 102) to focus on logical operations rather than the details of how data is actually stored. For example, for a relational database 106 (e.g., PostgreSQL®), the storage layer may manage how rows are laid out on disk. The data of this storage layer may be stored and accessed using different types of storage devices, such as hard disk drives, solid-state drives, and memory. In various embodiments, database 106 is implemented using a single or multiple storage devices that are connected together on a network (e.g., a storage attached network (SAN)) and configured to redundantly store information in order to prevent data loss. The storage devices may store data persistently and thus database 106 may serve as a persistent storage for system 100. Also, as discussed, components of system 100 may utilize the available cloud resources of a cloud infrastructure and thus the data of database 106 may be stored using a storage service provided by a cloud provider, such as Amazon S3®. As shown, database 106 includes current schemas 108 and 108' and target schemas 109 and 109'.

Schemas 108, 108', 109, and 109', in various embodiments, are database schemas that describe various types of database objects associated with database 106, such as tables, views, indexes, procedures, database triggers, and functions. These database schema may define how data is organized in database 106 and how subsets of data are related. In various embodiments, these schemas define logical groupings of database objects. As illustrated for example, source table 110 is part of current schema 108 and logically separated from target table 112, which is part of target schema 109. One or more of these database schemas (e.g., current schemas 108 and 108') may be used by database node 102 to access, interpret, and maintain the data of database 106.

In various embodiments, schemas 108, 108', 109, and 109' define database tables stored in database 106, including the attributes that make up the tables. For example, current schema 108 may define a "customer" database table having attributes (or columns) such as first name, last name, etc. Each one of those attributes may be associated with a set of properties defined by current schema 108. For example, the "first name" attribute may be associated with a data type of "char." In various embodiments, schemas 108, 108', 109, and 109' define relationships between database objects (e.g., database tables) in database 106. For example, current schema 108 may identify one or more indexes that are built on the customer database table of the prior example. Schemas 108, 108', 109, and 109' may further define, for a database table, a primary key that can be used to uniquely identify each record of the database table. Schemas 108, 108', 109, and 109' may define additional objects, such as database triggers that are executed upon certain events occurring in relation to certain database objects.

Tables 110, 110', 112, and 112', in various embodiments, are database tables containing a set of records—this set of records may be an empty set. These database tables may store data in an organized structure comprising columns and rows, in which a column defines an attribute and a row corresponds to a record that stores one or more values for the columns. For example, a column of source table 110 may correspond to usernames, and thus a record of source table 110 may include a value for the field that specifies a username. In various embodiments, tables 110, 110', 112, and 112' store data for multiple tenants (e.g., individuals, companies, etc.). As such, those tables may include a column defining tenant under which each row of those tables specifies a tenant corresponding to that row of data. In various embodiments, indexes are built based on one or more attributes of tables 110, 110', 112, and 112'. The entries in those indexes are sorted based on the one or more fields and may include a subset or all of the values of their corresponding records in the tables. The subset of values may include enough information that can be used to locate a corresponding record. Queries that are conditioned based on fields by which tables 110, 110', 112, and 112' are not ordered may be executed using the indexes.

Database node 102, in various embodiments, provides database services, including data storage, retrieval, and manipulation. In various embodiments, database node 102 is a database engine that is executed within a virtual machine that may be deployed on a cloud infrastructure. In some embodiments, database node 102 encompasses both the software and the hardware on which the software executes. Database node 102 may be part of a query layer that serves as an intermediary between clients (e.g., users or applications) and database 106, which may be part of the storage layer. Accordingly, database node 102 may receive database operation requests from applications (not shown) to perform database operations as part of database transactions. A database transaction, in various embodiments, is a logical unit of work (e.g., a specified set of database operations) to be performed in relation to database 106. For example, processing a database transaction may include executing a SQL SELECT command to select one or more rows from source table 110. The contents of a row may be specified in a record, and database node 102 may thus return one or more records that correspond to the one or more rows.

Performing a database transaction can also include database node 102 writing records to database 106. In various embodiments, records are immutable, and thus to update a record, database node 102 writes a new record with the updated value(s) for the same database key. As such, multiple records may exist for the same underlying structure (e.g., a row of a database table). In various embodiments, database node 102 optimizes the performance of processing database operation requests by leveraging indexing, caching, and query planning to minimize latency and resource usage. Database node 102 may also coordinate requests across multiple nodes. When servicing database traffic, in various embodiments, database node 102 references a database catalog to interpret how the data stored at database 106 is organized, how different elements relate to each other, etc. The database catalog may include one or more schemas, such as current schema 108, that organize database objects (e.g., tables, indexes, etc.) into separate groups/logical namespaces. Changes to these schemas can be made to support new features or functionality, improve database performance, address evolving data needs, etc. For example, schema changes can be made to add or drop columns from source table 110, alter the primary key definition of source table 110, change column data types of columns of source table 110, etc. These changes can be implemented using schema conversion engine 104.

Schema conversion engine 104, in various embodiments, is software that is executable to perform a table schema change process to implement database table schema changes. This table schema change process may be triggered, or otherwise initiated, in response to database node 102 receiving a database operation request that specifies a data definition language (DDL) statement that alters the definition of source table 110 (e.g., by dropping a column). As shown in FIG. 1, database node 102 can facilitate this schema transition through a combination of data copying, synchronization, and schema swapping. In various embodiments, prior to starting the table schema change process, target schema 109 does not exist. As such, when performing the table schema change process, schema conversion engine 104 may initially create target schema 109 and then target table 112 as part of target schema 109—as shown, schema ID 116B of target table 112 specifies "S2," which refers to target schema 109. Target table 112 incorporates the requested schema change(s). The creation of target schema 109 and target table 112 is discussed in more detail with respect to FIG. 2. Schema conversion engine 104 may also create temporary schema 111 to use during a schema swap operation to hold source table 110'.

After creating target schema 109 and target table 112 as part of target schema 109, in various embodiments, schema conversion engine 104 then provisions synchronization triggers 105 that capture record changes to source table 110 and replicate the changes on target table 112. Synchronization triggers 105, in various embodiments, are database triggers that are procedural code that is executed after a certain event (referred to as the "trigger event") occurs at system 100. (Database triggers can also be executed before the trigger event). For example, synchronization triggers 105 may include an insert trigger that inserts a record into target table 112 in response to the record being inserted into source table 110 (the trigger event) as part of performing a Data Manipulation Language (DML) operation requested in a database operation request. In various embodiments, synchronization triggers 105 operate in parallel with a copy operation (performed by schema conversion engine 104) to capture and replicate changes (e.g., new inserts, updates, and deletes) that occur on source table 110 while data is being transferred to target table 112. Synchronization triggers 105 may allow database node 102 to continue to process database operation requests during this table schema change process and thus users of system 100 may not experience downtime as a result of the process. Moreover, by maintaining transactional consistency during the table schema change process, synchronization triggers 105 can prevent data loss or inconsistencies that arise from concurrent modifications to source table 110. Synchronization triggers 105 are discussed in more detail with respect to FIG. 3.

After provisioning synchronization triggers 105 that capture and replicate changes, in various embodiments, schema conversion engine 104 then performs a copy operation to copy the existing data from source table 110 to target table 112. Copying the data over may involve schema conversion engine 104 issuing select insert statements to the database engine to select rows from source table 110 and insert them into target table 112. Schema conversion engine 104 may logically divide the existing data into blocks and the blocks into chunks. The chunks may then be copied over at least partially in parallel. In order to track the progress of the copy operation, including the dividing of the data into blocks and chunks, in various embodiments, schema conversion engine 104 provisions and maintains a set of progress tables. These tables are discussed in more detail with respect to FIG. 4, and the copy operation is discussed in more detail with respect to FIG. 5. After the copy operation has been completed, schema conversion engine 104 may validate the data in target table 112 by comparing that data against the data in source table 110.

After validating the data, in various embodiments, schema conversion engine 104 then performs a schema swap operation. As shown under the dashed horizontal line in the "after" portion, this operation updates the schema references so that target table 112 becomes the new active table within current schema 108. In particular, schema conversion engine 104 creates a temporary schema 111 to hold source table 110 and then modifies schema ID 116A of source table 110 to reference temporary schema 111, and thus the result is that schema ID 116A' of source table 110' references "S3," which corresponds to temporary schema 111. It is noted that the prime notation, as in source table 110' for example, refers to the element after the table schema change process (or particularly, the schema swap operation) has been performed. Schema conversion engine 104 then modifies schema ID 116B of target table 112 to reference current schema 108, and thus the result is that schema ID 116B' of target table 112' references "S1," which corresponds to current schema 108'. This schema swap process may be atomic. In some embodiments, after or in preparation for the swap operation schema conversion engine 104 executes clean-up tasks. For example, schema conversion engine 104 may issue a removal operation to drop synchronization triggers 105, as they are no longer needed once target table 112 has become the active table. Additionally, schema conversion engine 104 may later drop source table 110' to free up resources. The schema swap operation and various steps around it are discussed in more detail with respect to FIG. 6.

Figure 2:
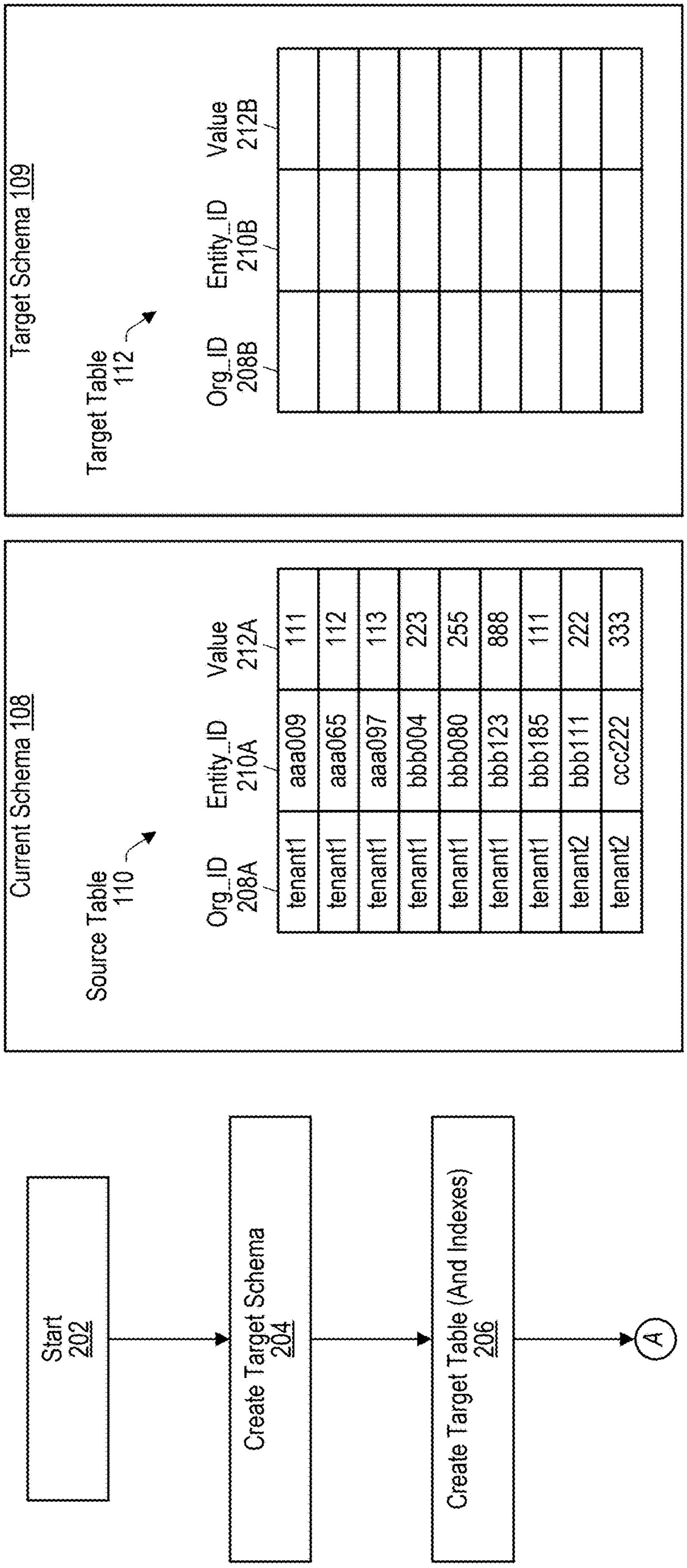
FIG. 2 is a diagram that illustrates one embodiment of a current schema and a temporary schema that is created during a table schema change process.

Turning now to FIG. 2, a diagram illustrating one embodiment of current schema 108 and target schema 109 is shown. FIG. 2 further depicts a portion of a table schema change process implemented by database node 102 (or particularly, schema conversion engine 104) this portion of the process may include more or fewer steps than shown. As shown, the process begins with an initialization step at block 202 that may be triggered by a request to apply a set of schema changes to source table 110. At block 204, database node 102 then creates target schema 109. In various embodiments, schema conversion engine 104 issues a create schema database statement to the database engine of database node 102 to create target schema 109. Target schema 109 may serve as an isolated environment in which target table 112 is prepared without affecting current schema 108, which can be used by database node 102 to process database transactions during the table schema change process.

At block 206, database node 102 creates target table 112 as a part of target schema 109. Target table 112 includes one or more schema changes relative to source table 110—e.g., the primary key definition for target table 112 may be different than the primary key definition of source table 110, target table 112 may include a set of additional columns or a set of columns may be dropped relative to source table 110, target table 112 may be a multi-tenant table while source table 110 does not have a notion of tenancy (e.g., no tenant ID column), etc. In various embodiments, arbitrary schema changes cannot be made; instead, the schema changes must satisfy a constraint that SELECT and DML statements issued against source table 110 must remain valid when applied to target table 112. Database node 102 may also create indexes on target table 112. These indexes may be created using the same definitions that were used to create them on source table 110—that is, source table 110's indexes may be recreated on target table 112. In some embodiments, in order to speed up data validation later, database node 102 creates an index that matches the primary key definition on source table 110, although any number of indexes that optimize the efficiency of the table copy, trigger, and validation steps may be created. This index may be dropped after the validation step or the schema swap operation. While not shown, in some embodiments, database node 102 also creates another temporary schema that is used to store source table 110 when the schema swap operation occurs.

FIG. 2 depicts an example of data that is initially stored in source table 110 before being migrated to target table 112 in target schema 109. Source table 110 stores structured data with three columns: org_id 208A, entity_id 210A, and value 212A. These columns represent different attributes of the records. For example, org_id 208A may be used to identify the tenant of a row/record in source table 110, entity_id 210A be used to identify a row/record, and value 212A may represent particular data (e.g., value 212A may be a "username" column). In FIG. 2, source table 110 contains multiple rows, demonstrating example entries where org_id 208A includes values such as tenant1 and tenant2 and entity_id 210A includes alphanumeric IDs that correspond to different records. Target table 112 is initially empty. Like source table 110, target table 112 defines the same set of columns: org_id 208B, entity_id 210B, and value 212B, which can help ensure compatibility between the two tables. But no data is yet present in target table 112 at this stage of the table schema change process.

Figure 3:
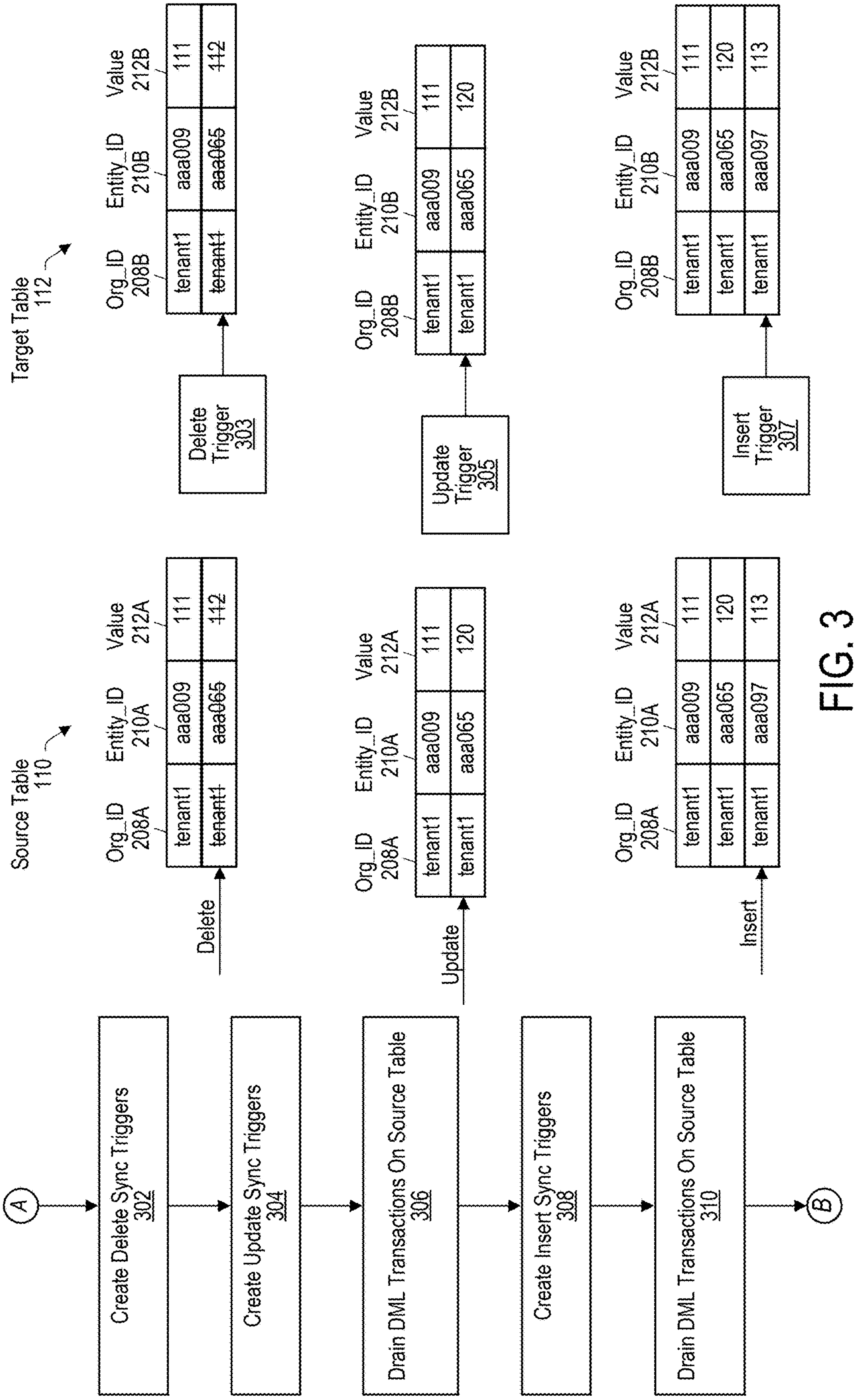
FIG. 3 is a diagram that illustrates one embodiment of synchronization triggers that are created during the table schema change process.

Turning now to FIG. 3 a diagram illustrating one embodiment of synchronization (sync) triggers 105 that are created is shown. FIG. 3 further depicts another portion of the table schema change process implemented by database node 102 (or particularly, schema conversion engine 104)—this portion may include more or fewer steps than shown. As shown, the process moves from point A (from block 206 of FIG. 2) to block 302. Once target schema 109 and target table 112 have been created, in various embodiments, the next step in the table schema change process involves setting up synchronization mechanisms before data copying occurs. As shown in FIG. 3, synchronization triggers are provisioned to capture ongoing changes that are applied to source table 110. The triggers may ensure that the changes occurring during the process are reflected in target table 112, and once the synchronization infrastructure is in place, the process proceeds to FIG. 4, where progress tables are created to facilitate the copy operation to copy data from source table 110 into target table 112. This infrastructure ensures that target table 112 remains up to date with incoming transactions before the schema swap operation is carried out.

At block 302, database node 102 creates delete triggers 303 that capture and propagate record deletes from source table 110 to target table 112. Next, at block 304, database node 102 creates update triggers 305 that capture updates to records in source table 110 and apply those updates to the corresponding records in target table 112. In various embodiments, delete triggers 303 and/or update triggers 305 only propagate the records deletes and updates if the corresponding records exist in target table 112. That is, if an update (for example) is made to a record in source table 110 but the record is not present in target table 112, then this may result in a no-op. Also, in some embodiments, database node 102 creates update triggers 305 before delete triggers 303—thus, block 302 may occur after block 304. At block 306, database node 102 then drains DML transactions on source table 110. That is, database node 102 may allow inflight transactions that were inflight before delete triggers 303 and update triggers 305 were created to complete, roll back, or otherwise no longer be inflight. These transactions may not be aware of delete triggers 303 and update triggers 305 while new transactions starting after delete triggers 303 and update triggers 305 were created are aware of those triggers. Therefore, database node 102 may allow the former transactions to drain so that only transactions that are aware of those triggers are inflight. In some cases, database node 102 may terminate particular transactions instead of allowing them to complete—e.g., a long-running transaction that might take hours to complete may be terminated by database node 102.

Once those DML transactions have been drained, then, at block 308, database node 102 creates insert triggers 303 that detect record inserts into source table 110 and propagate them to target table 112, ensuring that those records are also inserted into the target table 112. Next, at block 310, another drain operation is performed to ensure that all pending DML transactions on source table 110 have been drained before advancing to the next stage of the process. Once all transactions have a consistent visibility of delete triggers 303, update triggers 305, and insert triggers 307, then no data consistency should be introduced. Moreover, the particular order of creating both delete triggers 303 and update triggers 305 before insert triggers 307 may prevent data inconsistencies. In particular, if insert triggers 307 are created before delete triggers 303 and update triggers 305, then there may be a window of time in which insert triggers 307 insert records into target table 112 and changes are made to those records at source table 110 that are not propagated to target table 112 because delete triggers 303 and update triggers 305 have not yet been created.

As shown, the right side of FIG. 3 illustrates how these synchronization triggers interact with source table 110 and target table 112. Source table 110 and target table 112 store records that include, for example, three fields: org_id (208A, 208B), entity_id (210A, 210B), and value (212A, 212B). FIG. 3 shows the behavior of three operations, delete, update, and insert, as they are executed and mirrored across both tables. A delete operation is first shown being applied to a row in source table 110, removing that row A delete trigger 303 applies this deletion to the corresponding row in target table 112, maintaining consistency between the two tables. Next, an update operation is shown modifying a row in source table 110, where the value for field 212A is updated from 112 to 120. An update trigger 305 captures this change and applies it to the corresponding row of target table 112, updating the value of field 212B to 120. Finally, an insert operation is performed on source table 110, adding a new row. An insert trigger 307 ensures that the row is inserted into target table 112. As mentioned, delete triggers 303 and update triggers 305 may remain inactive for a given row until the row exists in target table 112 (e.g., it has been copied over during a copy operation or inserted by an insert trigger 307).

These synchronization triggers may collectively ensure that all modifications occurring to source table 110, whether they pertain to deletions, updates, or insertions, are propagated to target table 112, preserving data consistency throughout the table schema change process. In some embodiments, by executing these operations in the described sequence, the system avoids inconsistencies such as orphaned records or lost updates, enabling a smooth transition from the source schema to the updated schema without disrupting active database transactions.

Figure 4:
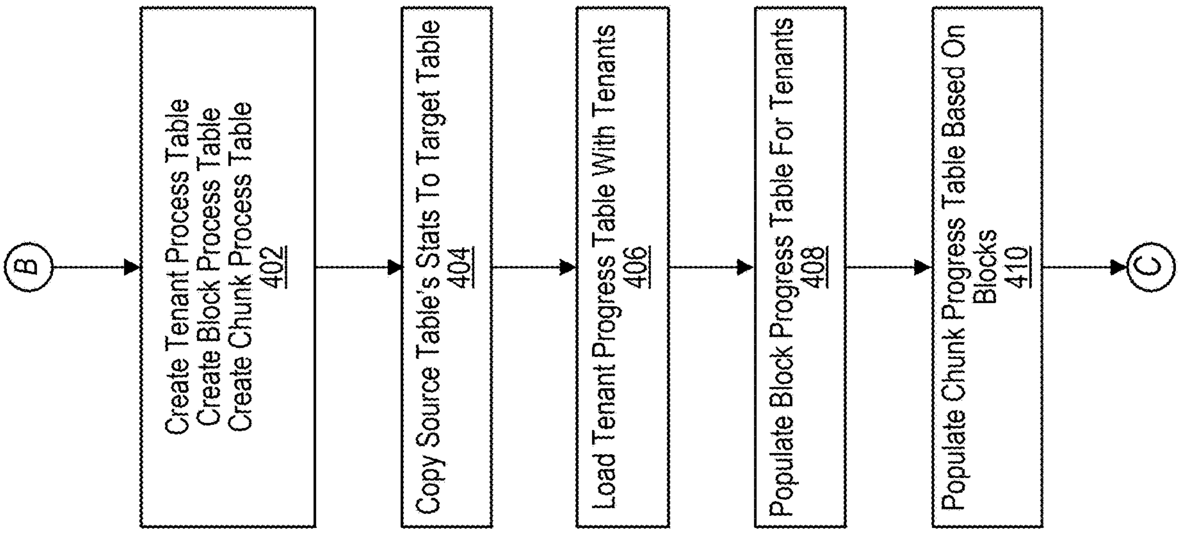
FIG. 4 is a diagram that illustrates one embodiment of progress tables that are created during the table schema change process.

Turning now to FIG. 4, a diagram illustrating one embodiment of the creation of a set of progress tables is shown. FIG. 4 further depicts another portion of the table schema change process that is implemented by database node 102 (or particularly, schema conversion engine 104)—this portion may include more or fewer steps than shown. In the illustrated embodiment, FIG. 4 continues from point B in FIG. 3, representing the next phase of the schema change process. After synchronization triggers 105 (e.g., delete triggers 303, update triggers 305, etc.) have been created, database node 102, in various embodiments, creates progress tables that are used to track the progress of the copy operation to copy existing data from source table 110 to target table 112. The progress tables may also allow for the table schema change process to be interrupted and later restarted without losing committed work. Moreover, because the progress tables can be tenanted, the rows of the progress tables can travel with a tenant as the tenant is migrated to another database instance, as discussed in more detail with respect to FIG. 7.

At block 402, database node 102 creates a tenant progress table 407, a block progress table 420, and a chunk progress table 426. Each of these tables includes status information that enable database node 102 to track which portions of the existing data of source table 110 have been processed, copied, and validated. In various embodiments, tenant progress table 407 is used to track the progress of copying and validating the data of a tenant from source table 110 to target table 112, block progress table 420 is used to track the progress of logically dividing data blocks of a tenant's data into chunks, and chunk progress table 426 is used to track the progress of copying the chunks of data from source table 110 to target table 112. By leveraging these tables, database node 120 may track the progress of the copy operation for one or more tenants. Next, at block 404, database node 102 copies source table 110's statistics to target table 112. This operation ensures that all applicable metadata associated with source table 110 is retained for target table 112, preserving characteristics including indexing information, row counts, and possibly other statistical measures used for query optimization. The statistics that are retained may include only those statistics for columns/indexes that match across the two tables.

At block 406, database node 102 loads tenant progress table 407 with tenant entries, marking the initial status of each tenant in the process. Tenant progress table 407 provides a high-level view of whether a tenant's data has been processed. As depicted in FIG. 4, tenant progress table 407 includes an organization ID (org_id 208) representing the tenant, a blocked status field 412 indicating whether the tenant's data has been logically divided into blocks, a chunked status field 414 indicating whether the blocks associated with the tenant have been divided into smaller segments (chunks), a copied status field 416 indicating whether the data has been copied to target table 112, and a validated status field 418 indicating whether the copied data has been validated for correctness. In the illustrated embodiment, tenant1's data has been divided into blocks and subdivided into chunks and thus blocked status field 412 and chunked status field 414 are set to true, but those chunks of data have not been copied over or validated and thus copied status field 416 and validated status field 418 are set to false in the row corresponding to tenant1. Tenant2's data has been divided into blocks but not subdivided into chunks and thus blocked status field 412 is set to true while chunked status field 414 is set to false in the row corresponding to tenant2.

At block 408, database node 102 divides the data of tenants recorded in tenant progress table 407 into one or more blocks for each tenant and populates block progress table 420 based on those blocks. Each block may correspond to a segment of a tenant's data. The criteria that determines how to divide a tenant's data into blocks may be different in different embodiments. In some embodiments, a tenant's data may be divided into blocks that correspond to different database object types. In particular, source table 110 may store different types of records. For example, source table 110 might store account records that detail accounts and contact records that detail contacts. Accordingly, a tenant's data may be logically divided into two blocks that cover account records and contact records, respectively. In the illustrated embodiment, block progress table 420 includes a key_prefix field 422 that is used to identify the type of the record in source table 110. Continuing the previous example, "aaa" may denote account records and "bbb" may denote contact records. In some embodiments, a tenant's data may be divided into blocks that have a maximum number of records or the tenant's data may be divided into a fixed number of blocks. Thus, different criteria may be used that may depend on the particulars of the database architecture where the table schema change process is implemented. As shown, block progress table 420 can further include a chunked status field 424 that is used to track whether a block has been subdivided into chunks. As shown, tenant1 has two blocks, labeled "aaa" and "bbb," both of which have been chunked, as indicated by the "t" values in chunked status field 424. However, tenant2 has a block labeled "ccc" that has not yet been chunked, as indicated by the "f" value.

At block 410, database node 102 divides the blocks recorded in block progress table 420 into chunks and populates chunk progress table 426 based on the chunks. Each chunk may correspond to a subportion of a block that is defined by a range of entity IDs. The criteria that determines how to divide the blocks into the chunks may be different in different embodiments. In some embodiments, a block is divided into chunks having a target number of records. For example, a block may cover 10,000 records and be divided into ten chunks that each cover 1,000 records. In some embodiments, a block is divided into a fixed number of chunks. Thus, different criteria may be used that may depend on the particulars of the database architecture. As shown, block chunk progress table 426 includes org_id 208, a min_entity_ID field 430 and a max_entity_ID 432 defining the range of records within the chunk, a copied status field 434 indicating whether the chunk has been copied to target table 112, and a validated status field 436 indicating whether the copied chunk has been verified for correctness. As shown, tenant1 has multiple chunks of data, some of which have been copied, as indicated by the "t" values in copied status field 434, but none of them have been validated yet, as indicated by the "f" values in validated status field 436.

FIG. 4 illustrates how progress tables provide structured tracking of the table schema change process at multiple levels: tenant, block, and chunk. Tenant progress table 407 tracks high-level status information for each tenant, block progress table 420 tracks whether a tenant's data has been divided into blocks and chunks, and chunk progress table 426 tracks whether individual chunks of data have been copied and validated. By leveraging these progress tables, database node 102 ensures that if a failure occurs, the table schema change process can resume from the last successful state rather than repeating completed work.

Figure 5:
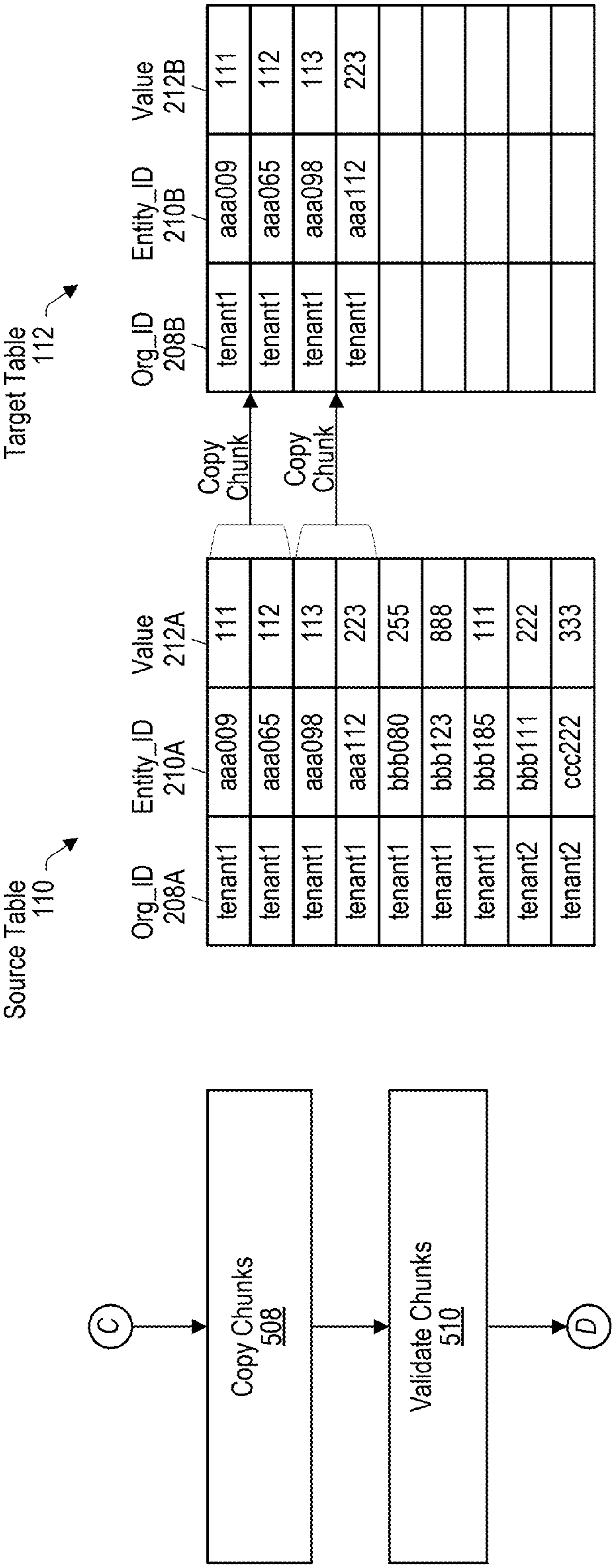
FIG. 5 is a diagram that illustrates one embodiment of copying and validating chunks during the table schema change process.

Turning now to FIG. 5 a diagram illustrating one embodiment of copying and validating chunks is shown. FIG. 5 further depicts another portion of the table schema change process that is implemented by database node 102 (or particularly, schema conversion engine 104) this portion may include more or fewer steps than shown. In the illustrated embodiment, FIG. 5 continues from point C in FIG. 4, representing the next phase of the process. As depicted, this phase advances through two steps: copying chunks at block 508 and validating chunks at block 510. These stages ensure that data is transferred systematically from source table 110 to target table 112 while maintaining integrity throughout the process. Given that this process may occur in a multi-tenant environment, database node 102 may also track the state of each tenant's data to ensure that all tenants' records are copied and validated appropriately.

As shown, source table 110 includes columns: org_id 208A, entity_id 210A, and value 212A and target table 112 includes org_id 208B, entity_id 210B, and value 212B. The process of copying data occurs in structured chunks, where each chunk may include a group of records that are copied together. As shown, the first two rows of source table 110 are copied into target table 112 as a chunk, and the third and fourth rows are copied into target table 112 as another chunk—the remaining rows of target table 112 are depicted as empty, indicating that the rows of source table 110 have not yet been copied.

In various embodiments, database node 120 spawns one or more processes to copy the chunks (identified in chunk progress table 426) to target table 112, where a given process may copy the rows of a chunk. A chunk may be copied over by a process at least partially in parallel or concurrently with one or more other chunks being copied by other processes. To copy one or more rows from source table 110 to target table 112, a process may issue one or more INSERT-SELECT statements to the database engine to select those rows from source table 110 and insert them into target table 112. In some embodiments, database node 120 spawns one process per tenant, and the process iterates through the chunks of the tenant's data, copying the records of one chunk before proceeding to the next chunk. In some embodiments, a work queue is used in which tasks corresponding to chunks are enqueued in the work queue, and a pool of worker processes may retrieve tasks from the queue and copy over the chunks. Accordingly, different approaches can be implemented to facilitate the copy operation.

Once the rows of a chunk have been copied over, then the corresponding entry in chunk progress table 426 may be updated to reflect that the chunk has been copied—the value under copied status field 434 may be set to true. Once the chunks of a tenant have been copied over, then the corresponding entry in tenant progress table 407 may be updated to reflect that the tenant's data has been copied—the value under copied status field 416 may be set to true. This chunked approach may help optimize memory usage and maintain performance efficiency, such as in large-scale multi-tenant environments where massive datasets are being migrated. Furthermore, after each iteration of copying, the system may determine whether there are any tenants left to process. If tenants remain, the system may continue the loop until all tenant data has been successfully copied.

Following the copying operation, database node 102 proceeds to block 510 to validate the copied chunks. This validation ensures that the records copied into target table 112 match the corresponding records in source table 110, preventing discrepancies that could compromise data integrity. In various embodiments, database node 120 spawns one or more processes (the processes could be the same ones that copied over the records) to compare records by chunk, where a process iterates through the records of a chunk, comparing the records between source table 110 and target table 112. If any inconsistencies are detected during validation, database node 102 may take corrective action, such as re-copying the affected chunks or flagging errors for further review. Once the rows of a chunk have been validated, then the corresponding entry in chunk progress table 426 may be updated to reflect that the chunk has been validated—the value under validated status field 436 may be set to true. Once the chunks of a tenant have been validated, then the corresponding entry in tenant progress table 407 may be updated to reflect that the tenant's data has been validated—the value under copied status field 416 may be set to true. Once all chunks have been validated for all relevant tenants of source table 110, then database node 102 may determine that target table 112 is fully synchronized with source table 110 and thus may proceed to the last phase of the table schema change process.

Figure 6:
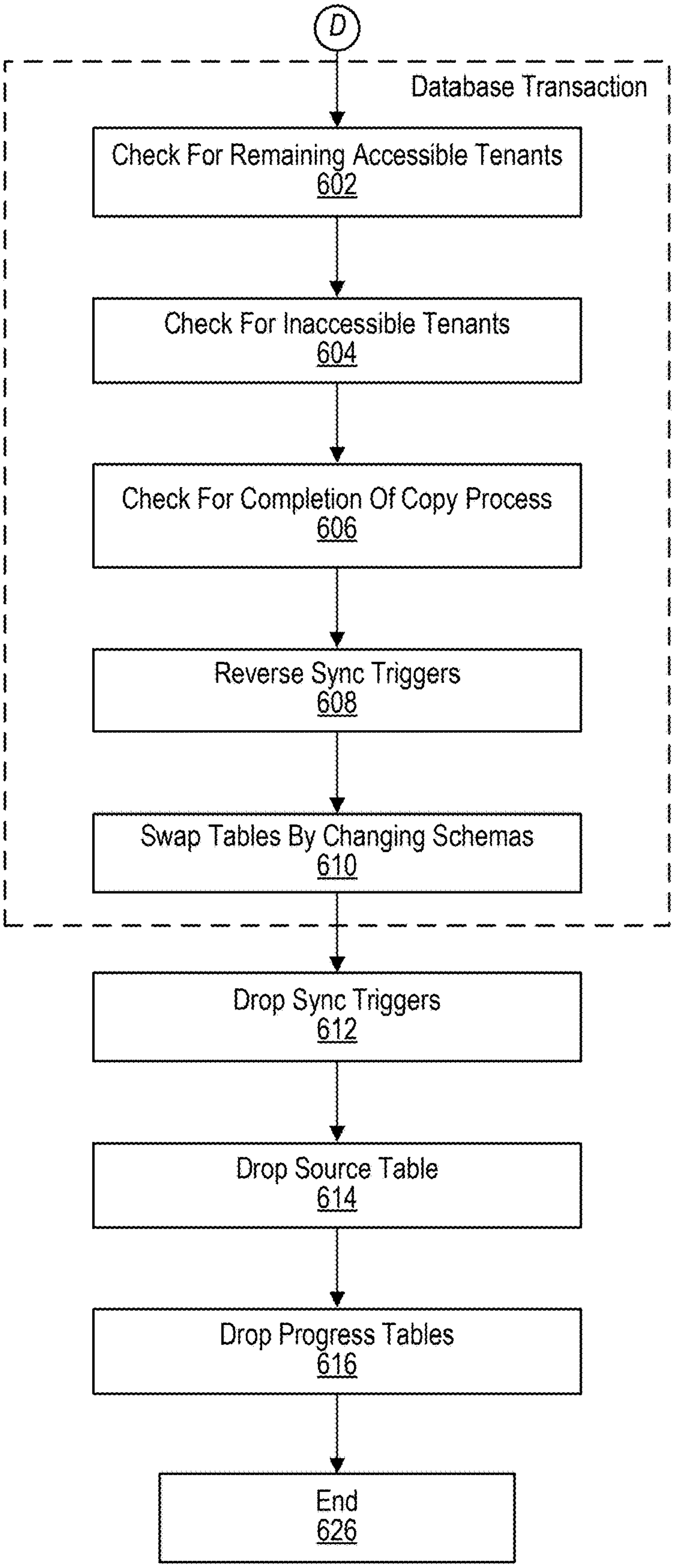
FIG. 6 is a diagram that illustrates one embodiment of swapping schemas for the source and target tables during the table schema change process.

Turning now to FIG. 6 a diagram illustrating one embodiment of swapping schemas of source table 110 and target table 112 is shown. FIG. 6 depicts another portion of the table schema change process that is implemented by database node 102 (or particularly, schema conversion engine 104)—this portion may include more or fewer steps than shown. In the illustrated embodiment, FIG. 6 continues from point D in FIG. 5, representing the final phase of the process. As shown, blocks 602-610 are depicted as part of the same database transaction. By performing these steps as part of the same transaction, this may ensure correctness because it ensures that all those operations take effect atomically. At block 602, database node 102 checks for any remaining accessible tenants that have not yet been copied. This step may ensure that all tenant data has been successfully copied before proceeding with the final steps. If there are accessible tenants whose data can copied over into target table 112, then database node 102 may return to an earlier step in the process, such as block 406 (where those tenants may be loaded into tenant progress table 407), then to block 408 (where their data is divided into blocks and block progress table 420 is populated), and so on.

At block 604, database node 102 checks for inaccessible tenants. In some cases, a tenant is temporarily inactive, or otherwise unavailable, due to constraints (e.g., the tenant is locked), maintenance, or other issues. Database node 102 may identify such tenants and then determine whether additional retries are required or if an alternative approach should be used. At block 606, database node 102 verifies whether the copy process has been fully completed. This check confirms that all chunks from source table 110 have been copied over into target table 112 and validated, as described in respect to FIG. 5. If any part of the copy process is incomplete, then database node 102 may retry the copy operation or flag errors for further review. Once database node 102 confirms that all data has been copied successfully, it proceeds to block 608, where it creates reverse synchronization triggers 105 that capture record changes to target table 112 and replicate the changes on source table 110. These synchronization triggers 105 may ensure the correctness of queries that run across the swap boundary as the queries can use stale cache entries, so they may query source table 110 instead of target table 112. All DML operations on target table 112 may thus be synced back to source table 110 for them temporarily. Database node 102 may also drop the synchronization triggers 105 that captured and replicated changes from source table 110 to target table 112.

At block 610, database node 102 then swaps target table 112 for source table 110 by changing schema associations, ensuring that target table 112 becomes the active table that is used by database node 102 when processing database transactions. To achieve this, in various embodiments, database node 102 updates target table 112's schema ID 116 to reference current schema 108 and source table 110's schema ID 116 to reference another schema, which may be temporary schema 111. This transition effectively replaces source table 110, allowing database queries and transactions to use target table 112. The illustrated database transaction may commit at this block. After the schema swap, at block 612, database node 102 removes the reverse synchronization triggers 105 that were setup at block 608. Next, at block 614, database node 102 drops source table 110. Since all data has been migrated, and the schema swap has been successfully completed, source table 110 may no longer be needed. In some embodiments, database node 102 may retain source table 110 for a predefined period for backup or recovery purposes before permanently deleting it.

At block 616, database node 102 then drops progress tables 407, 420, and 426. In some embodiments, progress tables 407, 420, and 426 are dropped before source table 110—that is, block 616 may be performed before block 614. The process concludes at block 626, marking the successful completion of the table schema change process. At this stage, all operations may now be directed to target table 112 instead of source table 110. The system has thus transitioned database operations to the new schema, removed obsolete data structures, and ensured that all tenant data has been fully migrated and validated.

Figure 7:
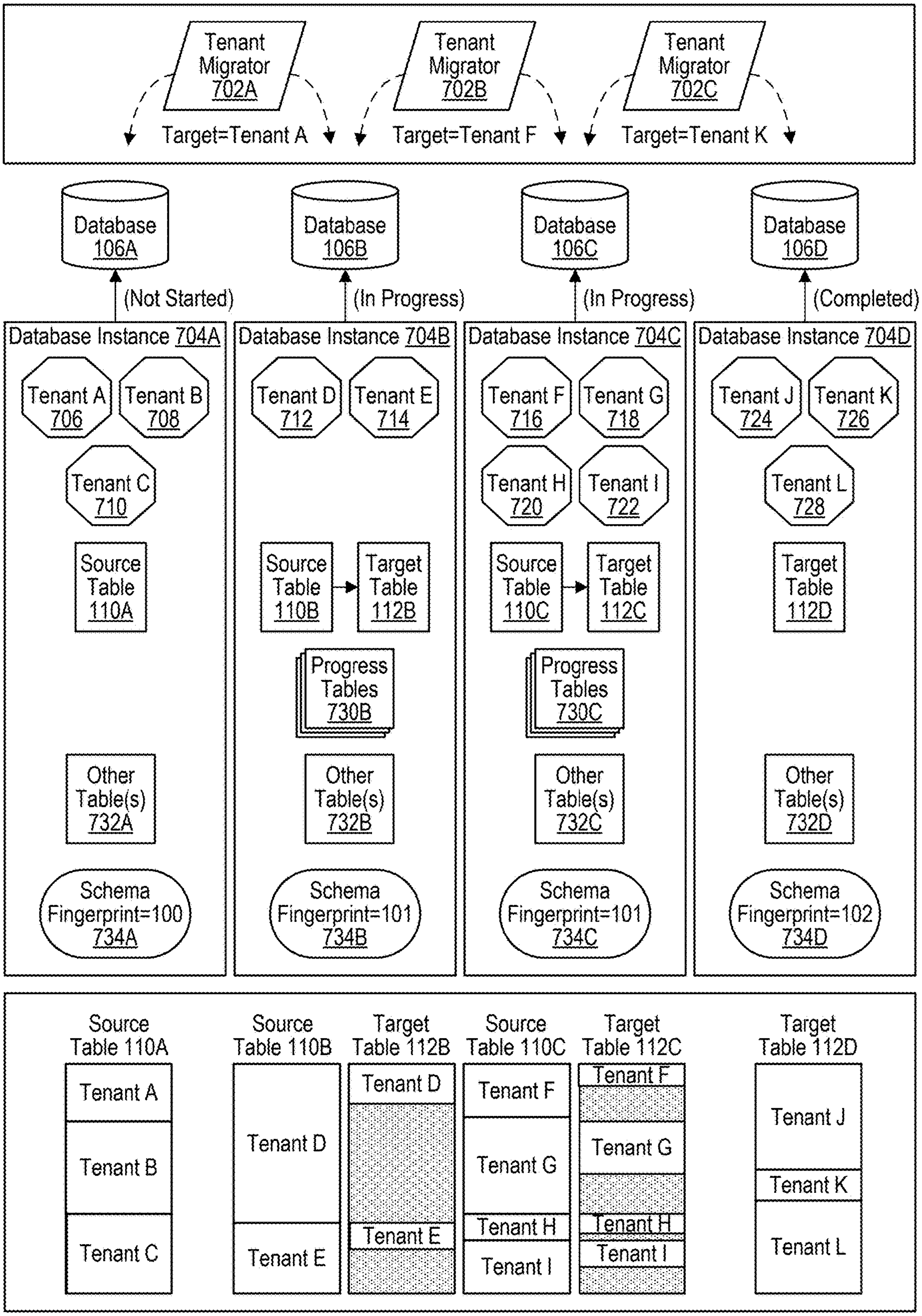
FIG. 7 is a block diagram that illustrates one embodiment of multi-tenant data migration that can occur during the table schema change process.

Turning now to FIG. 7, a block diagram illustrating one embodiment of multi-tenant data migration is shown. In the illustrated embodiment, there are database instances 704A-D, corresponding databases 106A-D, and tenant migrators 702A-C. As shown, database instance 704A includes tenant A 706, tenant B 708, tenant C 710, a source table 110A, and other tables 732A; database instance 704B includes tenant D 712, tenant E 714, a source table 110B, a target table 112B, progress tables 730B, and other tables 732B; database instance 704C includes tenant F 716, tenant G 718, tenant H 720, tenant I 722, a source table 110C, a target table 112C, progress tables 730C, and other tables 732C; and database instance 704D includes tenant J 724, tenant K 726, tenant L 728, a target table 112D, and other tables 732D. Also as shown, database instances 704A-D are respectively associated with schema fingerprints 734A-D. The illustrated embodiment may be implemented differently than shown. As an example, databases 106A-D may be considered part of their respective database instance 704.

The middle section of FIG. 7 illustrates four different database instances 704A, 704B, 704C, and 704D that are at different stages. Database instance 704A is associated with database 106A, which is marked as (not started), indicating that a table schema change process to implement one or more schema changes has not begun for this instance. Database instance 704B corresponds to database 106B, marked as (in progress), indicating that the table schema change process is in progress, and database instance 704C is linked to database 106C, also marked as (in progress), indicating that the table schema change process is in progress. Database instance 704D is associated with database 106D, which is marked as (completed), indicating that the table schema change process has completed.

Tenant migrators 702A-C, in various embodiments, are software that is executable to migrate tenants between database instances 704A-D. Database instances 704A-D may include respective database node(s) 102 that process requests against their respective databases 106A-D on behalf of tenants (e.g., individuals, companies, etc.) in those database instances 704A-D. Tenants may be migrated for various reasons. As an example, tenant F 716 may be migrated to database instance 704B to reduce the workload placed on database instance 704C. In various embodiments, a tenant may only be migrated if the schema fingerprints 734 of the source and destination database instances 704 match. The schema fingerprints 734 matching may indicate that the source and destination database instances 704 are compatible with each other such that migrating a tenant between them should not cause any data loss or inconsistencies.

Schema fingerprints 734A-D, in various embodiments, are each a hash value or a hash tree indicative of the structure (e.g., tables, indexes) of the corresponding database. In various embodiments, to create a schema fingerprint 734, hash functions are applied to various pieces of information specified in a database schema. In particular, a database instance 704 may hash together one or more properties of each attribute of different database objects in the database schema to derive a first level of a hash tree. The database instance 704 may then group hash values of the first level that are related to the same database object and apply a hash function to the individual groups to derive a second level of the hash tree. This process may continue (e.g., by hashing together the hash values of the second level) until a root hash value is derived at the top of the hash tree. This root hash value may thus be representative of the entire database schema in various embodiments. Additional details regarding the creation of the hash tree may be found in U.S. patent application Ser. No. 16/719,691, filed on Dec. 18, 2019. The application is incorporated herein by reference in its entirety.

As mentioned, schema fingerprints 734 that match may indicate that database instances 704 are compatible and thus a tenant can be migrated. In the illustrated embodiment, database instances 704B and 704C are both undergoing the table schema change process to implement the same schema changes to source table 110B and source table 110C, respectively, which are instances of the same table. As a result, schema fingerprints 734B and 734C match. Schema fingerprints 734A (100) and 734D (102), however, do not match schema fingerprints 734B and 734C (101) or each other. In regards to schema fingerprint 734A, since database instance 704A is not undergoing the table schema change process, it does not have progress tables or a target table 112. Thus, schema fingerprint 734A is different than schema fingerprints 734B and 734C as the generation of schema fingerprint 734A does not involve progress tables or a target table 112. In regards to schema fingerprint 734D, since database instance 704D has already undergone the process, it does not have progress tables or a source table 110. Thus, schema fingerprint 734D is different than schema fingerprints 734B and 734C as the generation of schema fingerprint 734D does not involve progress tables or a source table 110. Since schema fingerprints 734A and 734D are different than each and fingerprints 734B and 734C, tenants may not be migrated from database instance 704A to any of the other database instances 704B-D (until their schema fingerprints 734 match) and tenants may not be migrated from database instance 704D to any of the other database instances 704A-C(until their schema fingerprints 734 match). But since fingerprints 734B and 734C, tenants may be migrated between database instances 704B and 704C.

In various embodiments, the swap operation that is performed as a part of the schema change process does not modify the schema fingerprint 734 of the corresponding database instance 704 that performs the schema change process. Accordingly, to ensure that a tenant does not migrate from a database instance 704 that has performed the swap operation to one that has not performed the swap operation (or vice versa), a "dummy" column may be added to one of the progress tables 730 of the corresponding database instance 704 to force a change of the schema fingerprint 734 of that database instance 704.

When migrating a tenant from one database instance 704 to another database instance 704, tenant migrators 702A-C may create a snapshot of the tenant's data at the source database instance 704 and provide the snapshot to the destination database instance 704. This snapshot may identify a portion or all of the tenant's data that is stored within a database 106 at a particular point in time, but not data associated with other tenants. This snapshot may further identify the rows of progress tables of the source database instance 704 that are associated with the tenant. For example, if tenant E 714 is migrated to database instance 704C, then the rows of progress tables 730B (e.g., progress tables 407, 420, and 426) corresponding to tenant E 714 may be identified by the tenant's snapshot.

In various embodiments, the destination instance 704 uses the snapshot, including the rows of the progress tables, to resume the copy operation of the tenant's data from where the counterpart copy operation was halted at the source instance 704 before the tenant migration process was started. In particular, the destination instance 704 may load the tenant, the tenant's blocks (if applicable), and the tenant's chunks (if applicable) into its progress tables. The destination instance 704C may then resume the copy operation to copy the tenant's chunks from the instance's source table 110 to instance's target table 112. For example, if tenant D 712 is migrated to database instance 704C from database instance 704B, database instance 704C may utilize tenant D's snapshot to load progress tables 730C with blocks and chunks corresponding to tenant D 712. Database instance 704C may then copy tenant D's remaining chunks from source table 110C to target table 112C in accordance with progress tables 730C.

Figure 8:
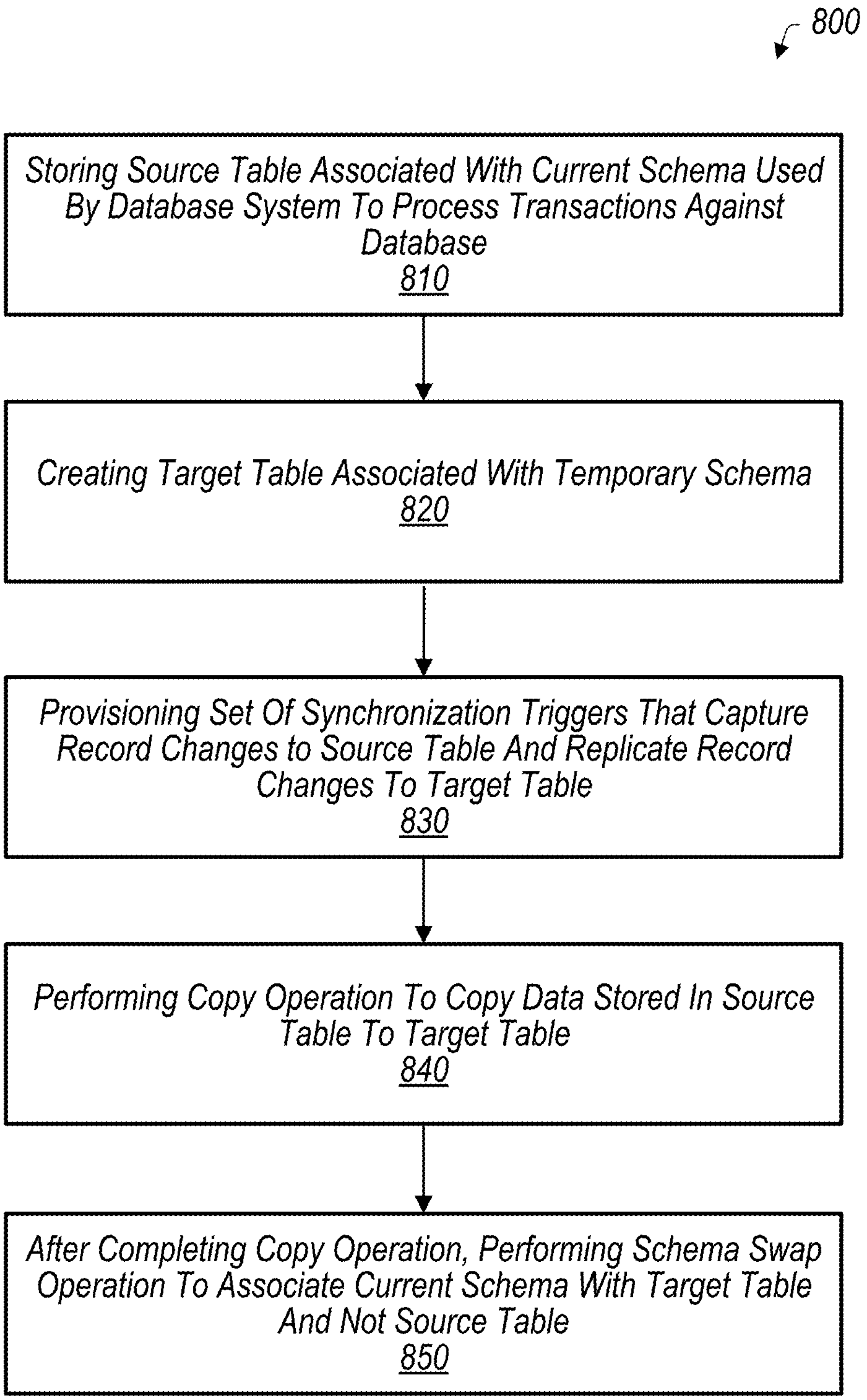
FIG. 8 is a flow diagram illustrating an example method that pertains to implementing database table schema changes.

Turning now to FIG. 8, a flow diagram of a method 800 is shown. Method 800 is one embodiment of a method performed by a database system (e.g., system 100 or database node 102) that pertains to implementing database table schema changes (e.g., a change to a primary key definition of a table). Method 800 may be performed by executing program instructions stored on a non-transitory computer-readable medium. Method 800 may include more or fewer steps than shown. As an example, method 800 may include a step in which the source table is dropped from the database.

Method 800 begins in step 810 with the database system storing a source table that is associated with a current schema used by the database system to process transactions against a database. The source table may store data for one or more tenants of the database system. For example, as shown in FIG. 1, system 100 includes database 106, which stores source table 110 associated with current schema 108. Source table 110 can maintain structured data, such as org_id 208A, entity_id 210A, and value 212A, which may be used by the database system to process transactions for multiple tenants, such as tenant A 706, tenant B 708, and tenant C 710.

In step 820, the database system then creates a target table associated with a temporary schema. The target table may include one or more schema changes relative to the source table. For example, as shown in FIG. 2, target table 112 is created as a part of target schema 109, which is distinct from current schema 108 that contains source table 110. In various cases, the one or more database table schema changes include a change to a primary key definition of the source table. Other changes may include a change to the data type of a column, a conversion of a non-multi-tenant table to a multi-tenant table, and the dropping of an unused column. In various embodiments, the database system also creates, before performing the copy operation in step 840, one or more indexes on the target table based on definitions used for the one or more indexes on the source table In step 830, the database system provisions a set of synchronization triggers to capture one or more record changes to the source table and replicate the one or more record changes to the target table. For example, as shown in FIG. 3, delete trigger 303, update trigger 305, and insert trigger 307 are used to track and replicate record changes occurring in source table 110 to target table 112. Accordingly, the set of synchronization triggers can include an insert trigger that is operable to insert a record into the target table in response to the record being inserted into the source table, an update trigger that is operable to update a record stored in the target table in response to the record being updated at the source table, and a delete trigger that is operable to delete a record from the target table in response to the record being deleted from the source table. These triggers may ensure that modifications such as deletions, updates, and insertions made to the source table during the migration process are applied to the target table, maintaining consistency between the two tables. In various embodiments, the provisioning of the set of synchronization triggers includes the database system provisioning the update and delete triggers and then, after allowing transactions that were in-flight before the provisioning of the update and delete triggers to complete, provisioning the insert trigger.

In step 840, the database system executes a copy operation to copy the data stored in the source table to the target table. The copy operation may be performed in parallel with one or more operations performed by the set of synchronization triggers. For example, as shown in FIG. 5, a copy operation transfers data from source table 110 to target table 112 in structured chunks. Each chunk may include a group of sequential records that are copied together from source table 110 in batches to target table 112. This copy operation may occur in parallel with delete trigger 303, update trigger 305, and insert trigger 307 that may continue capturing and propagating record changes to ensure consistency between the tables. The migration process may iterate through chunks of data until the entire source table is copied to the targe table.

In step 850, after performing the copy operation, the database system executes a schema swap operation to associate the current schema with the target table and not the source table. The schema swap operation may include removing the synchronization triggers and updating a schema identifier (e.g., schema ID 116B) of the target table to reference the current schema and a schema identifier (e.g., schema ID 116A) of the source table to reference another schema (e.g., the temporary schema).

In some embodiments, the database system validates the data stored in the target table after the copy operation has completed and before performing the schema swap operation. The validation may include comparing the data stored in the target table with the data stored in the source table and based on the comparison, determining whether the target table is synchronized with the source table. For example, as shown in FIG. 5, after executing the copy operation at block 508, the system proceeds to block 510, where it performs a validation process to ensure data consistency between source table 110 and target table 112. This validation may include comparing corresponding records stored in both tables and verifying whether the copied data in target table 112 accurately reflects the data in source table 110. If discrepancies are detected, the system may take corrective actions, such as re-copying affected data segments or flagging inconsistencies for further review. This validation step may ensure that target table 112 is fully synchronized with source table 110 before completing the schema migration process.

In some embodiments, the data stored in the source table is associated with one or more tenants (e.g., tenant A 706, tenant B 708, etc.). For a particular tenant, the database system may logically divide particular data stored in the source table that corresponds to the particular tenant into a set of blocks. As an example, as shown in FIG. 4, the data of "tenant1" is logically divided into two blocks. The database system may further logically divide a given block of the set of blocks into a set of chunks. The copy operation may include the database system copying, chunk by chunk, the set of chunks from the source table to the target table. The database system may create a set of progress tables that includes: a tenant progress table (e.g., tenant progress table 407) that is used to track progress of copying the particular data of the particular tenant from the source table to the target table; a block progress table (e.g., block progress table 420) that is used to track progress of the logically dividing of the set of blocks into the set of chunks; and a chunk progress table (e.g., chunk progress table 426) that is used to track progress of the copying of the set of chunks from the source table to the target table.

As part of a transfer of management of a particular tenant managed by another database system (e.g., database instance 704B), in various embodiments, the database system receives, during the copy operation, information identifying tenant data of the particular tenant that is associated with the source and target tables. As such, the copy operation may include copying at least a portion of the tenant data of the particular tenant from the source table to the target table. In some embodiments, the information identifies at least a portion of a set of progress tables that track progress of a counterpart copy operation that is being performed by the other database system. The portion of the set of progress tables may enable the database system to resume copying of the data of the particular tenant from where the counterpart copy operation halted before the transfer of management of the particular tenant In cases where management of a particular tenant is transferred, the receiving database system may use these progress tables to determine the state of the migration at the time of transfer. This allows the receiving database system to resume copying operations from the last recorded state, rather than restarting the copy operation for the tenant from the beginning.

Exemplary Computer System

Figure 9:
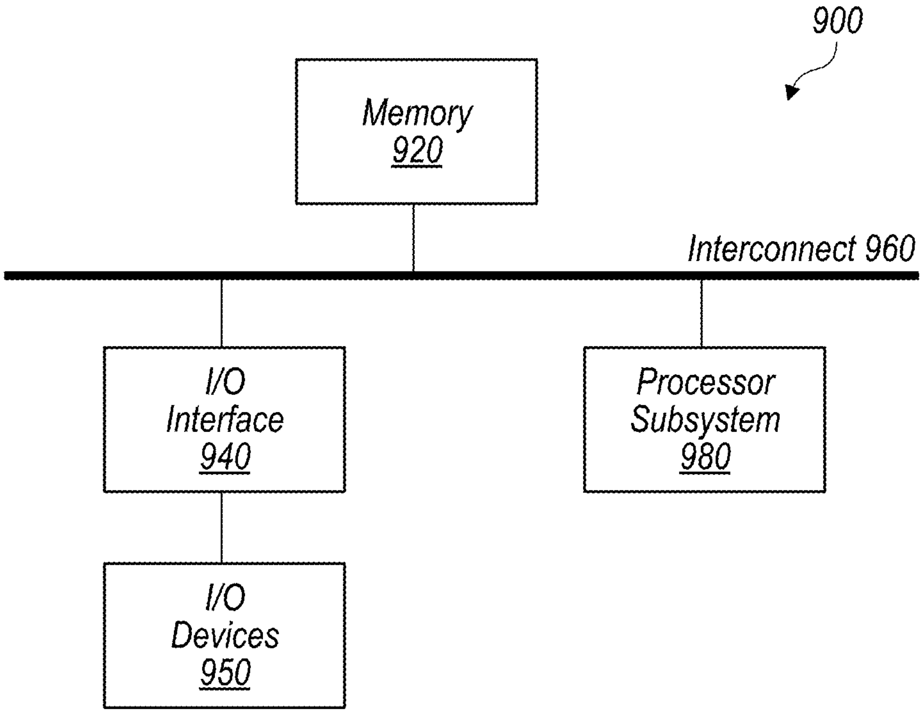
FIG. 9 is a block diagram illustrating elements of a computer system for implementing various systems described in the present disclosure, according to some embodiments.

Turning now to FIG. 9, a block diagram of an exemplary computer system 900, which may implement system 100, database node 102, database 106, and/or database instances 704A-D, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In various embodiments, program instructions executable to implement schema conversion engine 104, synchronization triggers 105, and/or tenant migrators 702A-C are included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C.

This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for implementing database table schema changes, comprising:

storing, by a database system, a source table associated with a current schema used by the database system to process transactions against a database;

creating, by the database system, a target table associated with a temporary schema, wherein the target table includes one or more database table schema changes relative to the source table;

provisioning, by the database system, a set of synchronization triggers that is operable to capture record changes made to the source table and replicate the record changes to the target table;

performing, by the database system, a copy operation to copy data stored in the source table to the target table, wherein the copy operation is performed at least partially in parallel with operations performed by the set of synchronization triggers; and after completing the copy operation, the database system performing a schema swap operation to associate the current schema with the target table and not the source table.

2. The method of claim 1, where the data stored in the source table is associated with one or more tenants, and wherein the method further comprises:

for a particular one of the one or more tenants, the database system logically dividing:

particular data stored in the source table that corresponds to the particular tenant into a set of blocks; and a given block of the set of blocks into a set of chunks, wherein the copy operation includes the database system copying, chunk by chunk, the set of chunks from the source table to the target table.

3. The method of claim 2, further comprising:

creating, by the database system, a set of progress tables that includes:

a tenant progress table that is used to track progress of copying the particular data of the particular tenant from the source table to the target table, a block progress table that is used to track progress of the logically dividing of the set of blocks into the set of chunks, and a chunk progress table that is used to track progress of the copying of the set of chunks from the source table to the target table; and tracking, by the database system, progress of the copy operation for the one or more tenants using the set of progress tables.

4. The method of claim 1, further comprising:

before the performing of the schema swap operation, the database system validating data stored in the target table after completing the copy operation, wherein the validating includes:

comparing the data stored in the target table against the data stored in the source table; and based on the comparing, determining whether the target table is synchronized with the source table.

5. The method of claim 1, further comprising:

as part of a transfer of management of a particular tenant managed by another database system, the database system receiving, during the copy operation, information identifying data of the particular tenant that is associated with the source and target tables, wherein the copy operation includes copying at least a portion of the data of the particular tenant from the source table to the target table.

6. The method of claim 5, wherein the information identifies at least a portion of a set of progress tables that track progress of a counterpart copy operation that is being performed by the other database system, wherein the portion of the set of progress tables enables the database system to resume copying of the data of the particular tenant from where the counterpart copy operation halted before the transfer of management of the particular tenant.

7. The method of claim 5, wherein the transfer of management of the particular tenant is permitted in response to a detection that a schema fingerprint of the database system matches a schema fingerprint of the other database system, and wherein the method further comprises:

updating, by the database system, the schema fingerprint of the database system as part of performing the schema swap operation.

8. The method of claim 1, wherein the set of synchronization triggers include:

an insert trigger that is operable to insert a first record into the target table in response to the first record being inserted into the source table;

an update trigger that is operable to update a second record stored in the target table in response to the second record being updated at the source table; and a delete trigger that is operable to delete a third record from the target table in response to the third record being deleted from the source table.

9. The method of claim 8, wherein the provisioning of the set of synchronization triggers includes:

provisioning, by the database system, the update and delete triggers; and after allowing transactions that were in-flight before the provisioning of the update and delete triggers to complete, the database system provisioning the insert trigger.

10. The method of claim 1, further comprising:

prior to the performing of the copy operation, the database system:

creating a set of database objects on the target table based on definitions used for the set of database objects on the source table, wherein the set of database objects includes at least one index and at least one database trigger; and creating one or more indexes for the copy operation, wherein the one or more indexes are dropped after the schema swap operation.

11. A non-transitory computer-readable medium having program instructions stored thereon that are capable of causing a computer system to perform operations comprising:

storing a source table associated with a current schema used to process transactions against a database;

creating a target table associated with a temporary schema, wherein the target table includes one or more database table schema changes relative to the source table;

provisioning a set of synchronization triggers that is operable to capture record changes made to the source table and replicate the record changes to the target table;

performing a copy operation to copy data stored in the source table to the target table, wherein the copy operation is performed at least partially in parallel with operations performed by the set of synchronization triggers; and after completing the copy operation, performing a schema swap operation to associate the current schema with the target table and not the source table.

12. The non-transitory computer-readable medium of claim 11, wherein the performing of the schema swap operation includes:

removing the set of synchronization triggers; and updating a schema identifier of the target table to reference the current schema and a schema identifier of the source table to reference another schema.

13. The non-transitory computer-readable medium of claim 11, wherein the operations further comprise:

performing a division operation to logically divide the data stored in the source table into a set of chunks, wherein the copy operation includes spawning a plurality of processes to copy the set of chunks from the source table to the target table.

14. The non-transitory computer-readable medium of claim 11, wherein the operations further comprise:

receiving, as a part of a tenant migration of a tenant from another database, information identifying data of the tenant that is associated with the source and target tables; and resuming, based on the received information, copying of the data of the tenant from the source table to the target table from where a counterpart copy operation that is associated with the other database halted before the tenant migration.

15. The non-transitory computer-readable medium of claim 11, wherein the operations further comprise:

creating a tenant progress table that is used to track progress of copying data of tenants of the source table to the target table;

in response to a transfer of management of a tenant associated with another database, inserting an entry for the tenant into the tenant progress table to track progress of copying the tenant's data from the source table to the target table; and as part of the schema swap operation, obtaining a lock to prevent tenant creation, tenant removal, and tenant migration for the database during the schema swap operation.

16. A system, comprising:

at least one processor; and a memory having program instructions stored thereon that are executable by the at least one processor to cause the system to perform operations comprising:

storing a source table associated with a current schema used by the system to process transactions against a database;

creating a target table associated with a temporary schema, wherein the target table includes one or more database table schema changes relative to the source table;

provisioning a set of synchronization triggers that is operable to capture record changes made to the source table and replicate the record changes to the target table;

performing a copy operation to copy data stored in the source table to the target table, wherein the copy operation is performed at least partially in parallel with operations performed by the set of synchronization triggers; and after completing the copy operation, performing a schema swap operation to associate the current schema with the target table and not the source table.

17. The system of claim 16, where the data stored in the source table is associated with one or more tenants, and wherein the operations further comprise:

for a particular one of the one or more tenants, logically dividing:

particular data stored in the source table that corresponds to the particular tenant into a set of blocks; and a given block of the set of blocks into a set of chunks, wherein the copy operation includes copying, chunk by chunk, the set of chunks from the source table to the target table.

18. The system of claim 17, wherein the operations further comprise:

creating a set of progress tables that includes:

a tenant progress table used to track progress of dividing the data of the one or more tenants into sets of blocks, a block progress table used to track progress of dividing the sets of blocks of the one or more tenants into sets of chunks, and a chunk progress table used to track progress of copying the sets of chunks from the source table to the target table; and tracking progress of the copy operation for the one or more tenants using the set of progress tables; and prior to performing the schema swap operation, validating that tenants associated with the source table have been recorded in the tenant progress table, data of the tenants has been divided into blocks and chunks, and the data has been validated after being copied from the source table to the target table.

19. The system of claim 16, wherein the operations further comprise:

receiving, as a part of a tenant migration of a tenant from another database, information identifying data of the tenant that is associated with the source and target tables; and resuming, based on the received information, copying of the data of the tenant from the source table to the target table from where a counterpart copy operation that is associated with the other database halted before the tenant migration.

20. The system of claim 16, wherein the set of synchronization triggers include:

an insert trigger that is operable to insert a first record into the target table in response to the first record being inserted into the source table;

an update trigger that is operable to update a second record stored in the target table in response to the second record being updated at the source table; and a delete trigger that is operable to delete a third record from the target table in response to the third record being deleted from the source table.

* * * * *